R. E. TOMBAUGH.
TRACTOR WHEEL.
APPLICATION FILED JUNE 4, 1915.

1,171,988.

Patented Feb. 15, 1916.

WITNESSES:

INVENTOR
Roy E. Tombaugh.
BY
ATTORNEY

UNITED STATES PATENT OFFICE.

ROY E. TOMBAUGH, OF ROANN, INDIANA.

TRACTOR-WHEEL.

1,171,988.  Specification of Letters Patent.  Patented Feb. 15, 1916.

Application filed June 4, 1915. Serial No. 32,110.

*To all whom it may concern:*

Be it known that I, ROY E. TOMBAUGH, a citizen of the United States, and a resident of Roann, county of Wabash, and State of Indiana, have invented a certain new and useful Tractor-Wheel; and I do hereby declare that the following is a full, clear, and exact description thereof, reference being had to the accompanying drawings, in which like letters refer to like parts.

This invention relates to a means for constructing a tractor wheel having disappearing cleats. By means of an adjustment in the hub of the wheel, the cleats may be projected past the felly when it is found necessary to use them for any purpose, but when on the road and especially on roads where cleats are not permitted to be used, they may be withdrawn within the felly of the wheel by simply adjusting them at the hub.

The full nature of the invention may be understood from the accompanying drawings and the following description and claims.

Figure 1:
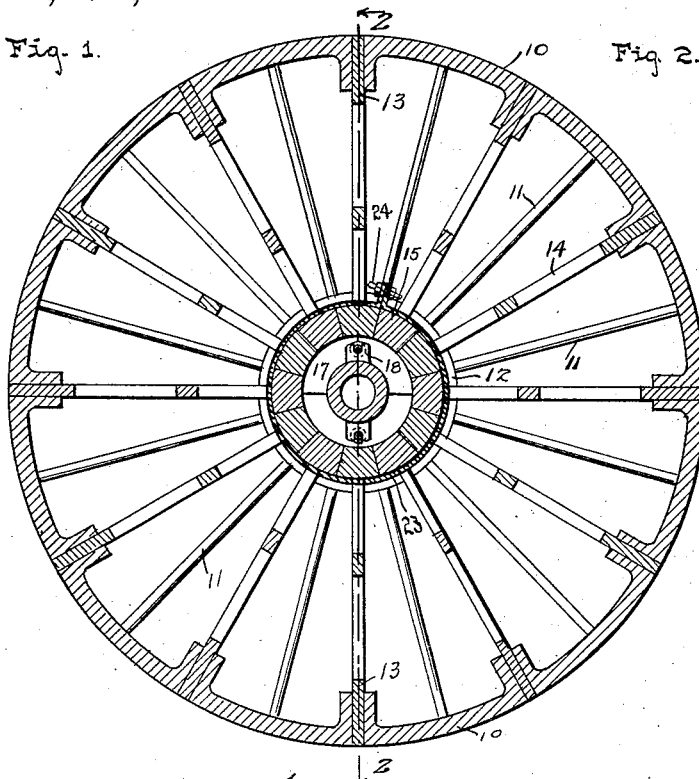
Figure 2:
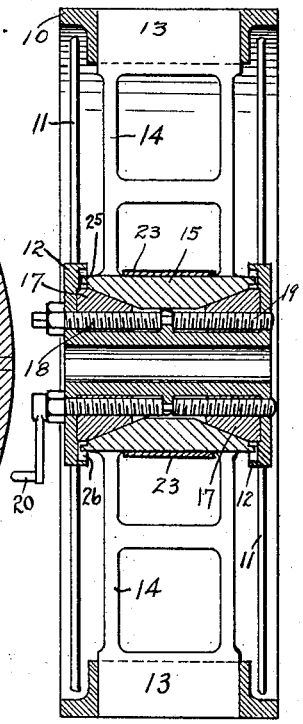
Figure 3:
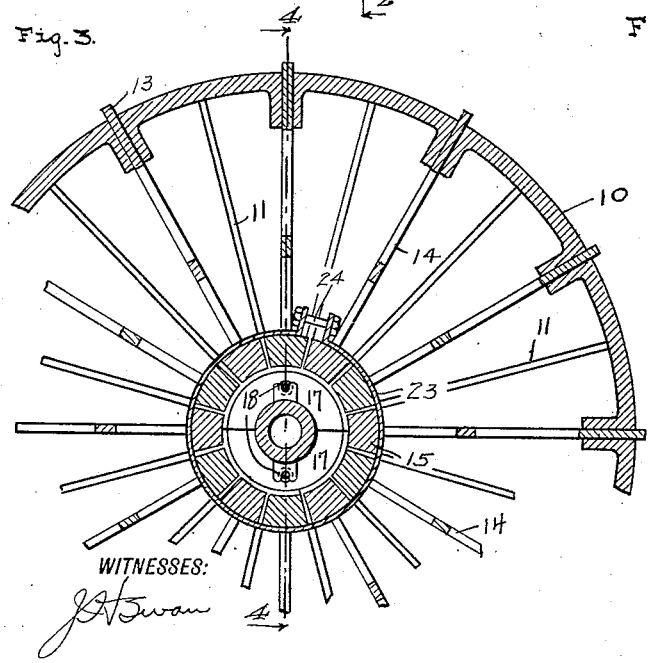
Figure 4:
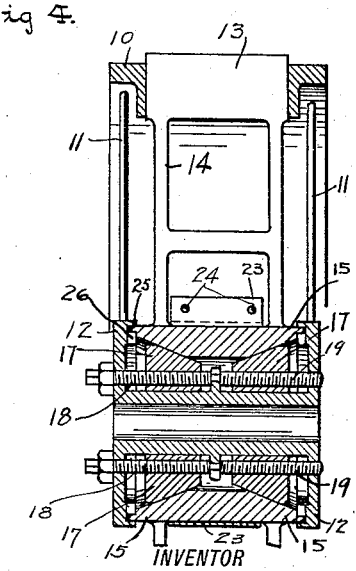

In the drawings Figure 1 is a vertical section of the tractor wheel showing the cleats withdrawn within the felly. Fig. 2 is a cross section on the line 2—2 of Fig. 1. Fig. 3 is the same as Fig. 1 showing the cleats in extended position. Fig. 4 is a cross section on the line 4—4 of Fig. 3.

In the drawings there is shown a tractor wheel having a felly 10, spokes 11, and hub 12. The felly has slots within it in alinement with the axle through which the adjustable cleats 13 extend. Said cleats 13 have a frame 14 which is secured to an auxiliary expanding hub member 15. Said hub member 15 is comprised of a plurality of wedge shaped members, one attached to each frame 14 and adapted to fit together so as to form an auxiliary hub around the hub 12. Between the hub 12 and the auxiliary hub members 15 there are two wedge members 17 which are adapted to slide toward each other on the hub 12 so as to force said auxiliary hub members outward. Extending transversely through said wedge members there are two worm screws 18 on opposite sides of the hub secured to the oppositely threaded worm screws 19. Secured to said screws there is a removable crank 20 and a lock nut 21 for holding said screws in position when adjusted. Surrounding the periphery of the auxiliary hub members 15, there is an expandible band 23 for holding said members in place. Said band is adjusted by a bolt 24. When traveling on hard roads or where cleats are not permitted, the tubular wedges may be forced apart by the oppositely threaded worms so that the cleat is lowered in alinement with the surface of the felly and the expandible band is then drawn together and tightened by the set screw, but when it becomes necessary to use cleats, the band may be loosened and by means of the worm screws, the wedge may be drawn together forcing the cleat outward through the slot in the felly, and locked into position by the lock nut 21. Extending from the ends of each member of the auxiliary hub, there is a projection 25 which extends in a slot 26 in the main hub for guiding the members in their movement, and preventing any lateral displacement.

The invention claimed is:

1. A tractor wheel having a felly with slots therein, movable cleats extending outwardly through said slots, a plurality of auxiliary hub members attached to said cleats, oppositely tapered tubular wedge members for holding said cleats in their outward position and oppositely threaded shafts for operating said wedge members.

2. A tractor wheel having slots in the felly thereof, cleats adapted to extend through said felly, expandible hub members connected to said cleats, means for expanding said hub members, and an expandible band surrounding said hub members for holding them in place.

3. A tractor wheel, cleats adapted to extend past the periphery of said wheel, expansible hub members connected to said cleats, means for expanding said hub members, and an expansible band surrounding said hub members for holding them in place.

In witness whereof, I have hereto affixed my signature in the presence of the witnesses herein named.

ROY E. TOMBAUGH.

Witnesses:
C. F. GOLTRY,
J. M. LOWMAN.